United States Patent
Ohmura

(10) Patent No.: US 7,159,355 B2
(45) Date of Patent: Jan. 9, 2007

(54) FISHING REEL MOUNTING STRUCTURE AND MOVABLE HOOD BODY FOR FISHING POLE

(75) Inventor: Ryuichi Ohmura, deceased, late of Shizuoka (JP); by Masaru Muroi, legal representative, Tokyo (JP)

(73) Assignee: Fuji Kogyo Co., Ltd., Shizuoka (JP)

( * ) Notice: Subject to any disclaimer, the term of this patent is extended or adjusted under 35 U.S.C. 154(b) by 0 days.

(21) Appl. No.: 10/846,580

(22) Filed: May 17, 2004

(65) Prior Publication Data
US 2005/0000145 A1 Jan. 6, 2005

(30) Foreign Application Priority Data
May 16, 2003 (JP) ............... 2003-138920

(51) Int. Cl.
A01K 87/06 (2006.01)
(52) U.S. Cl. ......................................... 43/22
(58) Field of Classification Search .................. 43/22; D22/142
See application file for complete search history.

(56) References Cited

U.S. PATENT DOCUMENTS

| 481,941 A | 9/1892 | Falvey |
| 819,500 A | 5/1906 | Bearse |
| 831,764 A | 9/1906 | Bartlett |
| 905,428 A | 12/1908 | Heddon |
| 951,731 A | 3/1910 | Haskell |
| 953,775 A | 4/1910 | Becraft |
| 1,339,238 A | 5/1920 | Tillman |
| 1,367,272 A | 2/1921 | Lane |
| 2,120,467 A | 6/1938 | Howarth |
| 2,656,639 A | 10/1953 | Phillipson |
| 2,737,747 A | 3/1956 | Benson et al. |
| 3,197,908 A * | 8/1965 | Hirsch ............... 43/22 |
| 3,461,594 A * | 8/1969 | Ohmura ............. 43/22 |
| 4,045,902 A | 9/1977 | Ohmura |
| 4,083,141 A | 4/1978 | Shedd et al. |
| 4,726,139 A * | 2/1988 | Tokuda ............... 43/22 |
| 4,762,584 A * | 8/1988 | Andreasen et al. ...... 156/245 |
| 4,830,306 A * | 5/1989 | Tsunoda et al. ........ 242/316 |
| 4,903,427 A * | 2/1990 | Yamato ............... 43/22 |
| 4,920,682 A * | 5/1990 | Andreasen et al. ...... 43/22 |
| 5,189,824 A * | 3/1993 | Yamato ............... 43/22 |
| 5,291,684 A * | 3/1994 | Oyama ............... 43/23 |
| 5,600,915 A * | 2/1997 | Ohmura ............... 43/22 |
| 6,067,740 A * | 5/2000 | Alley ................ 43/22 |

(Continued)

FOREIGN PATENT DOCUMENTS
JP  Y2 3-13186  3/1991

(Continued)

Primary Examiner—Michael J. Carone
Assistant Examiner—Bret Hayes
(74) Attorney, Agent, or Firm—Oliff & Berridge, PLC.

(57) ABSTRACT

The invention provides a fishing pole mounting structure that can secure properly firm mounting of a fishing reel. A movable hood part is structured by gradually expanding a predetermined location, in a circumferential direction of a cylindrical body outwardly towards one end in the longitudinal direction from the other end in the longitudinal direction to form a cover hood. The inner surface of the cover hood is formed in a shape corresponding to the end surface, the top surface and side surfaces on the outer end of a reel leg part of a fishing reel, and seats that support the reel leg part of the fishing reel are formed at both sides in the width direction of this inner surface, respectively.

12 Claims, 6 Drawing Sheets

U.S. PATENT DOCUMENTS 6,105,301 A * 8/2000 Ohmura ................ 43/22
6,381,898 B1    5/2002 Lee
6,460,285 B1   10/2002 Collins

FOREIGN PATENT DOCUMENTS

JP          U 63-66473       5/1998

* cited by examiner

FISHING REEL MOUNTING STRUCTURE AND MOVABLE HOOD BODY FOR FISHING POLE

BACKGROUND OF THE INVENTION

1. Field of Invention

The present invention relates to a fishing reel mounting structure for fixedly mounting a fishing reel on an outer surface of a fishing pole, and to a movable hood body for a fishing pole to be utilized in the fishing reel mounting structure.

2. Description of Related Art

A mounting structure for mounting a fishing reel on a fishing pole includes a fixed hood part provided at a butt end of the fishing pole, and a movable hood part provided at the butt end of the fishing pole facing the fixed hood part. By moving the movable hood part toward the fixed hood along the fishing pole in a state that one side of reel leg part of the fishing reel is inserted into an insertion hood of the fixed hood part and by tightly covering a cover hood of the movable hood part onto the other side of the reel leg part of the fishing reel, the reel leg part of the fishing reel is sandwiched on both sides in the longitudinal direction by the fixed hood part and the movable hood part, so that the fishing reel is fixedly mounted on the fishing pole.

The cover hood of the movable hood part has a structure to tightly cover the other side of the reel leg part of the fishing reel that is directly pressed to the outer surface (generally an outer surface of a pipe seat structure forming a part of fishing pole) of the fishing pole. However, in this structure, the other side of the reel leg part deforms the outer surface of the fishing pole, like making the surface dented when the cover hood tightly covers the other side of the reel leg part of the fishing reel. Therefore, there still remains a problem as to how to adjust the cover hood for desirably covering the other side of the reel leg part. That is, situations easily occur such that a proper tightening force may not act on the other side of the reel leg part as the degree of covering by the cover hood is insufficient, or on the other hand, the other side of the reel leg part is caused to dig into the cover hood too much as a result of covering the other side of the reel leg part of the fishing reel by the cover hood with excessive pressing force, causing a sliding nut installed on the movable hood part to be forcibly taken away from the movable hood part when the movable hood is retracted to remove the fishing reel.

Accordingly, a movable hood part with a bottom part formed to make the cover hood in a bag shape is used (see Japanese Utility Model Publication No. 3-13186 (Page 2, FIG. 3) for example). By structuring the movable hood part in such a way, the cover hood covers the other side of the reel leg part until an outer end of the other side of the reel leg part contacts a front end of the cover hood, thereby an appropriate fixture condition of the other side of the reel leg part can be secured.

SUMMARY OF THE INVENTION

However, if the bottom part is formed in the cover hood, the bottom part functions as a deformation preventing element even if the outer end of the other side of the reel leg part or both ends in the width direction of the outer end contact both ends in the width direction of the front of the cover hood when covering with the cover hood, and interferes expansion of the both ends in the width direction of the cover hood. Then, the movable hood part can not be expected to deform to be flattened in the width direction (width direction of the other side of the reel leg part), or the movable hood part cannot be expected to tighten the other side of the reel leg part and the fishing pole. Hence, it is difficult to secure properly firm mounting of the fishing reel. Moreover, even if the outer end of the other side of the reel leg part presses the inner surface of the ceiling of the cover hood to deform the ceiling of the cover hood in expanding outwardly, the bottom part interferes with contact between both ends in the width direction of the movable hood part and both ends in the width direction of the outer end of the other side of the reel leg part. At this point, it is also difficult to secure properly firm mounting of the fishing reel. Thus, when a strong force is applied to the fishing reel, such as by a fish with a strong moving force, it may produce play between the moval hood and the leg part of the fishing reel.

Therefore, an object of the present invention is to provide a fishing reel mounting structure that enables a proper firm mounting of the fishing reel, and a movable hood body for the fishing pole to be utilized in the fishing reel mounting structure.

The present invention provides a fishing reel mounting structure including a fixed hood part provided fixedly on a fishing pole and having an insertion hood, and a movable hood part structured to move along the fishing pole and having a cover hood. The fishing reel mounting structure fixes a fishing reel on the fishing pole by inserting one side of the reel leg part of the fishing reel into the insertion hood of the fixed hood part and moving the movable hood part along the fishing pole to position the cover hood over the other side of the reel leg part of the fishing reel. A pair of seats supporting the other side of the reel leg part of the fishing reel are formed at both sides in the width direction of an inner surface of the cover hood. The cover hood of the movable hood part tightly covers the other side of the reel leg part in a state that seat surfaces of the pair of seats support backsides of the end portions in the width direction of the other side of the reel leg part to fix the fishing reel on the fishing pole.

As such, when covered with the cover hood, the other side of the reel leg part can not be excessively pressed against the outer circumferential surface of the fishing pole, and therefore, the denting deformation of the outer circumferential surface of the fishing pole is reduced or impeded. In addition, since the seats are provided separately at both sides in the width direction of the inner surface of the cover hood, the end portions in the width direction of the cover hood are expanded so as to not interfere with tightening the fishing pole with the movable hood part, tightening the other side of the reel leg part with the cover hood, or firmly attaching the end portions in the width direction of the cover hood to the end portions in the width direction of the other side of the reel leg part. The seats also impede or reduce the opportunity of the other side of the reel leg part of the fishing reel from being displacing in its circumferential direction.

Embodiments of the present invention may include the movable hood part formed as a cylindrical body fitted on an outer circumference of the fishing pole, and the cover hood structured such that a portion of the movable hood part is expanded outwardly.

In some cases, the reel leg part of the fishing reel is structured such that the backsides of the end portions in the width direction being positioned keeping a space from the outer circumferential surface of the fishing pole when the other side of the reel leg part of the fishing reel is pressed against the outer circumferential surface of the fishing pole. When mounting the fishing reel, it is preferable in some embodiments, that the pair of seats be formed such that the positions of the seat surfaces in the circumferential direction substantially match the positions in the circumferential direction of the backsides of the end portions in the width direction of the other side of the reel leg part which is to be pressed against the outer circumferential surface of the fishing pole.

Other embodiments of the present invention may include the pair of seats formed such that when covering the other side of the reel leg part with the cover hood, the pair of seats engage the backsides of end portions in the width direction of the other side of the reel leg part without contacting an outer end of the other side of the reel leg part which is to be pressed against the outer circumferential surface of the fishing pole.

With such a structure, it is not necessary to step a troublesome mounting process to firmly cover the other side of the reel leg part with the cover hood, like while slightly lifting the outer end of the other side of the reel leg part of the fishing reel from the outer circumferential surface of the fishing pole, sliding the movable hood part to insert the other side of the reel leg part of the fishing reel into the cover hood.

In addition, unlike the above case in which the other side of the reel leg part of the fishing reel is required to be lifted from the outer circumferential surface of the fishing pole, the diameter of the handle part of the fishing pole can not be made larger. This feature is feasible in the present invention because it is not necessary to make the cover hood bulging. Thus, a user is expected to avoid getting stressed due to holding the large-diameter butt section of the fishing pole. Furthermore, by inserting the other side of the reel leg part of the fishing reel like expanding the end portions in the width direction of the cover hood, or by deforming the cover hood to expand outwardly, the seats are slightly lifted or almost lifted. As a result, the seat surfaces of the seats desirably support the backsides of the end portions in the width direction of the other side of the reel leg part. The intermediate portion in the width direction of the other side of the reel leg part, for example sides in the width direction of the intermediate portion in the width direction are desirably supported by the outer circumferential surface of the fishing pole.

Furthermore, embodiments of the present invention include a movable hood body for a fishing pole including a cover hood that covers a leg part (the other side of the reel leg part) of a fishing reel and is formed movable along the fishing pole. A pair of seats supporting the other side of the reel leg part of the fishing reel at both sides in the width direction of an inner surface of the cover hood, and the cover hood tightly covers the reel leg part in a state that seat surfaces of the pair of seats support the backsides of the end portions in the width direction of the reel leg part.

DETAILED DESCRIPTION OF PREFERRED EMBODIMENTS

Figure 1:
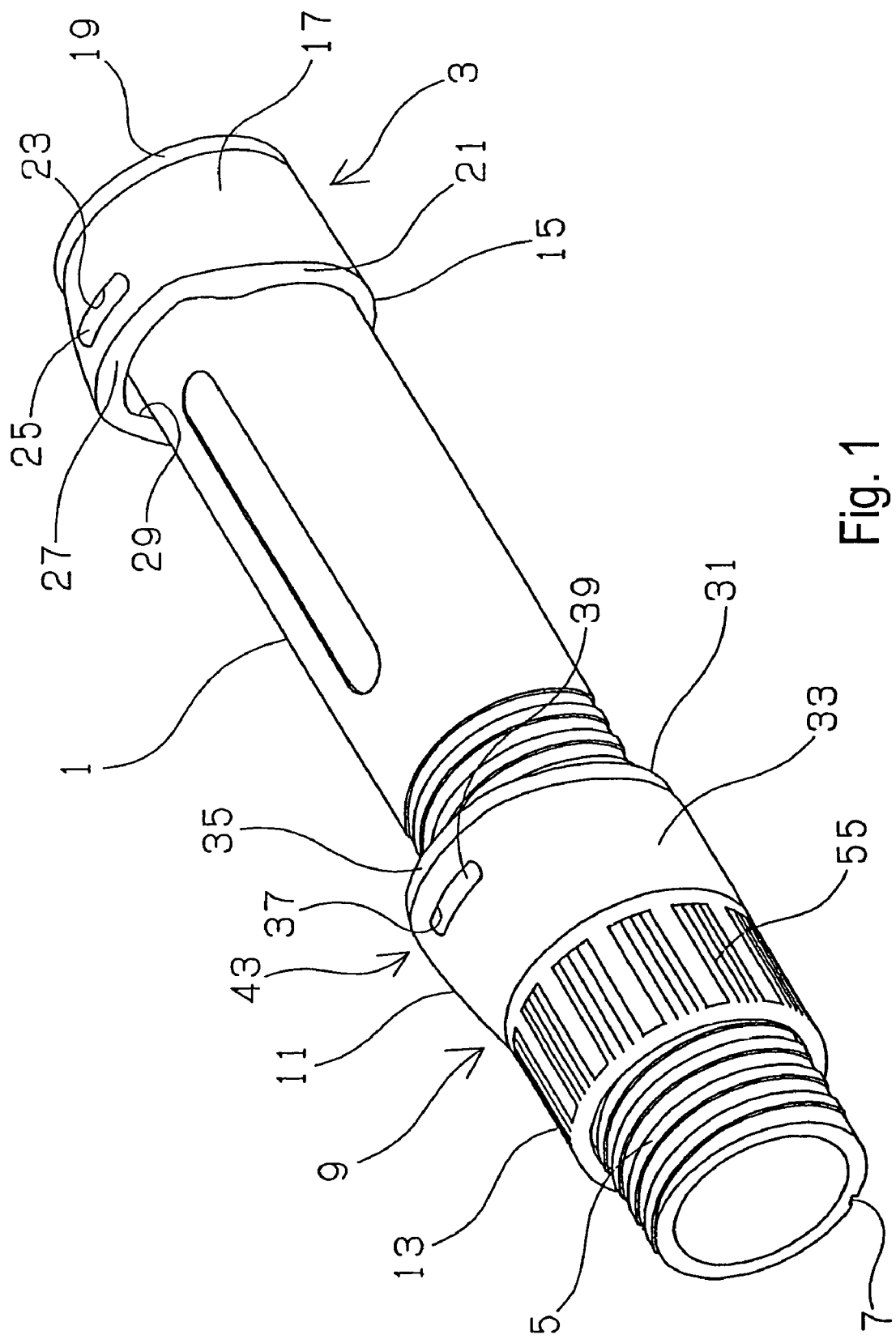
FIG. 1 is a perspective view of a pipe seat having a fishing reel mounting structure in accordance with an exemplary embodiment of the present invention.
Figure 2:
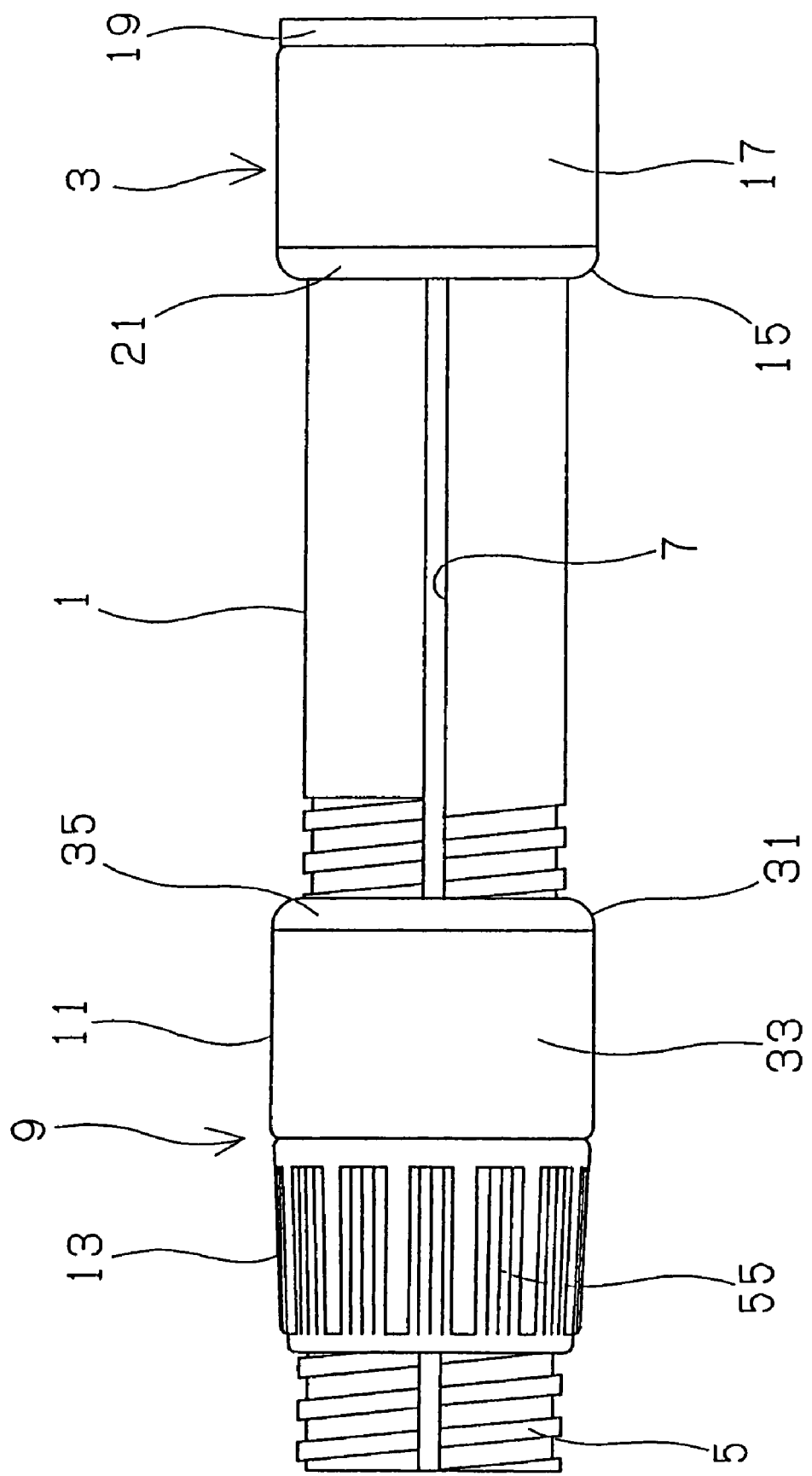
FIG. 2 is a bottom view of the pipe seat in accordance with an exemplary embodiment of the present invention.
Figure 3:
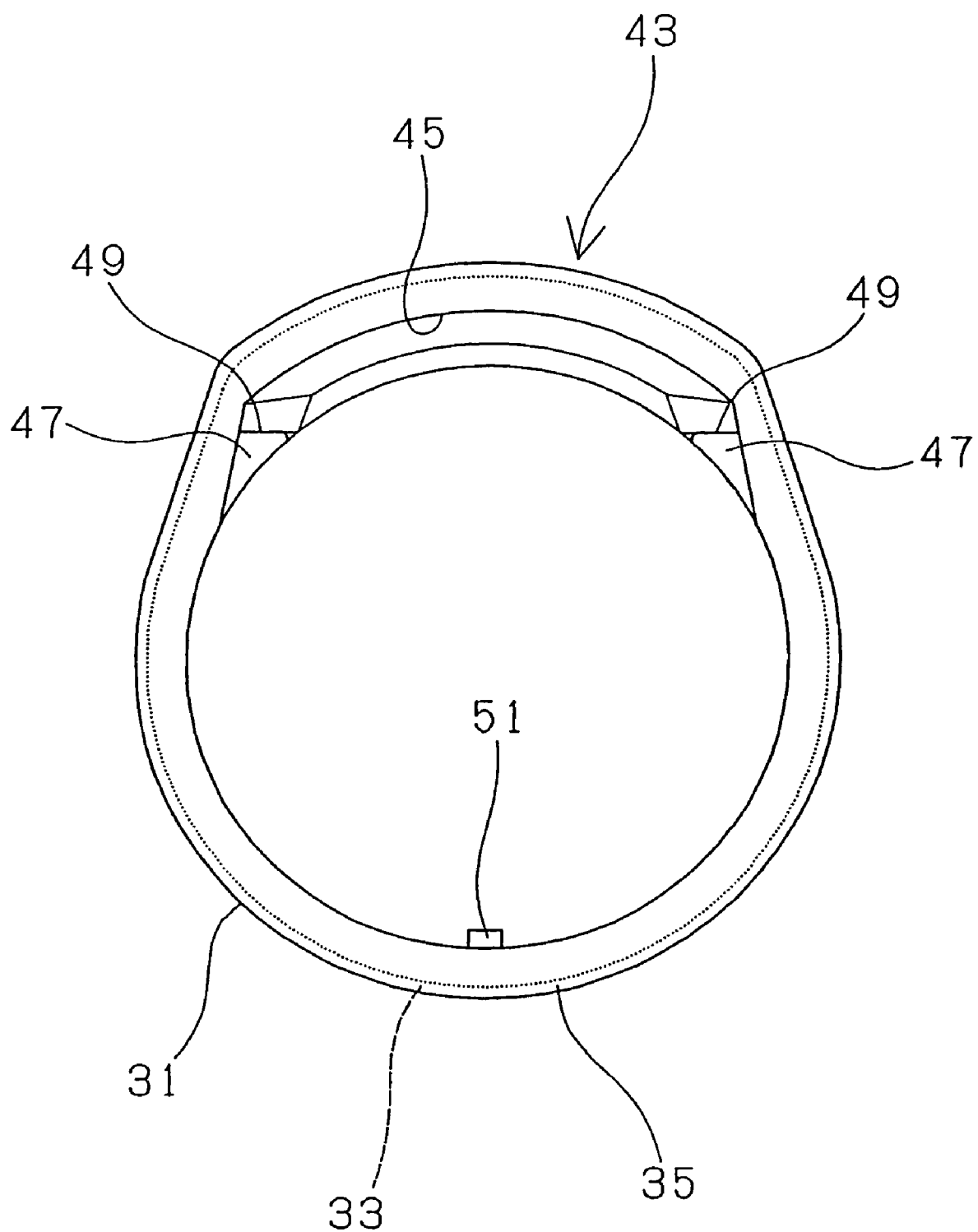
FIG. 3 is an interior-end view of a movable hood part in accordance with an exemplary embodiment of the present invention.
Figure 4:
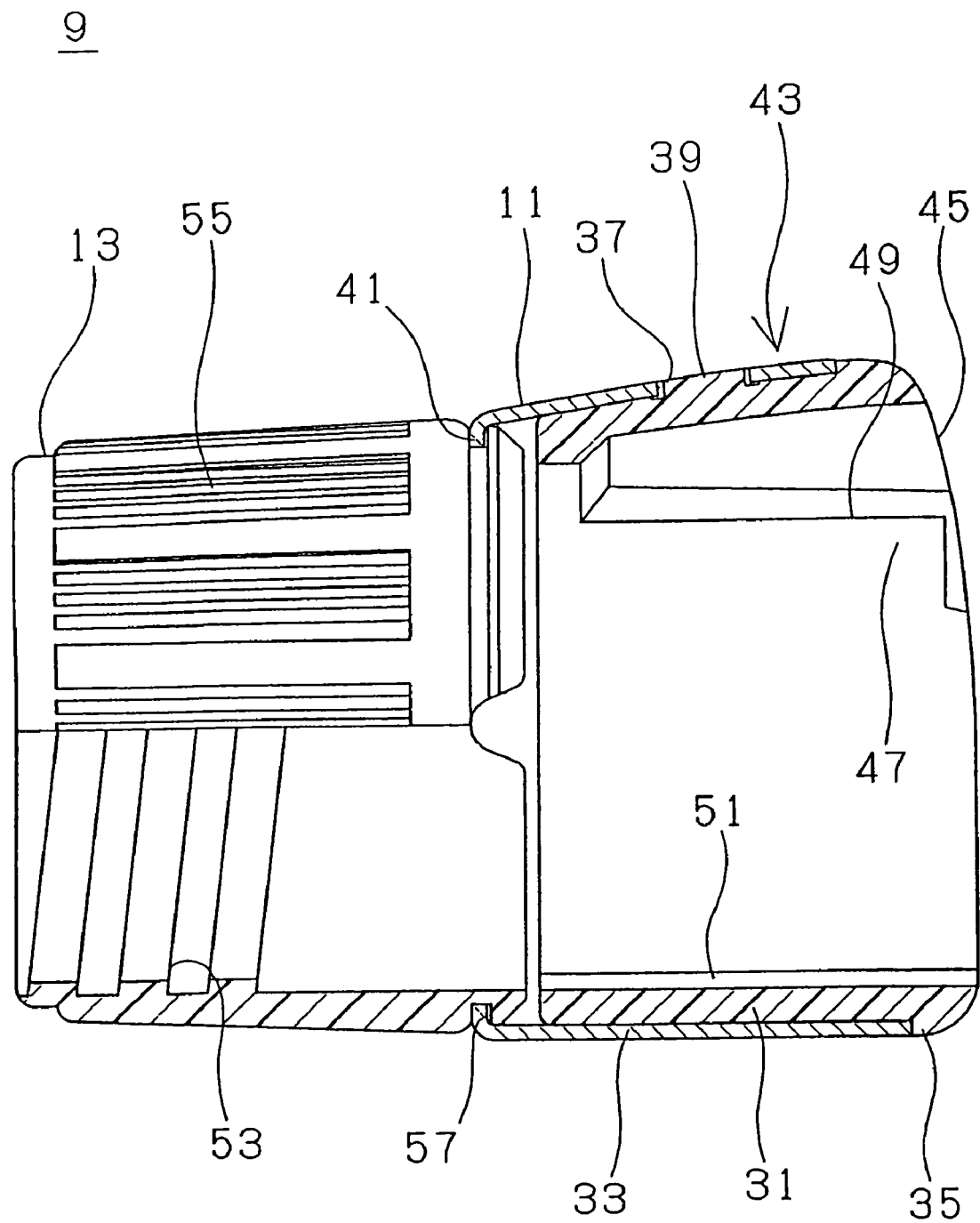
FIG. 4 is a longitudinal, cross-sectional view of the movable hood body in accordance with an exemplary embodiment of the present invention.

Exemplary embodiments of the present invention are described below with reference to the accompanying drawings. However, the present invention is not limited to the exemplary embodiments described below.

A pipe seat 1 is formed in a cylindrical body made of plastic and has a fixed hood 3 in the outer circumference of one end in the longitudinal direction or the pole tip-side end. On the outer circumference from the other end in the longitudinal direction or the pole butt side end towards the center in the longitudinal direction, there is provided a male thread part 5. The pipe seat 1 also has a slide guide groove 7 extending linearly from one end to the other end in the longitudinal direction on the outer circumferential surface. A movable hood body 9 (movable hood body for fishing pole) which is movable forward and backward in the longitudinal direction is mounted on the male thread part 5. The movable hood body 9 includes a movable hood part 11 facing the fixed hood part 3 and formed to be able to move on the male thread part 5, and a sliding nut 13 connected rotatably to the movable hood part 11 and screwed on the male thread part 5.

The fixing hood part 3 includes of a cylindrical plastic fixed hood member 15 and a cylindrical metal reinforcement sleeve 17 engaged with the outer circumference of the fixed hood member 15. One end and the other end in the longitudinal direction of the outer circumferential surface of the fixed hood member 15 are provided with ring-shaped protrusions 19 and 21, respectively, that slightly protrude outwardly. The reinforcement sleeve 17 is tightly fitted on the entire outer circumferential surface of the fixed hood member 15 in a state that the reinforcement sleeve 17 is located between the ring-shaped protrusions 19 and 21 and positioned in the longitudinal direction. An engagement hole 23 is provided on the reinforcement sleeve 17. To this engagement hole 23, an engagement protrusion 25 formed integrally on the outer circumferential surface of the fixed hood member 15 is fitted without any space. Therefore, the reinforcement sleeve 17 is mounted on the fixed hood member 15 in a state that it is fixed in the longitudinal and circumferential directions.

The fixed hood member 15 is structured from forming an insertion hood 27 such that a predetermined portion in the circumferential direction of the cylindrical body having an inner diameter substantially equal to the outer diameter of an end of the pipe seat 1 in the longitudinal direction gradually expands outwardly from the one end towards the other end in the longitudinal direction. An insertion opening 29 is provided at the other end in the longitudinal direction of the insertion hood 27. The insertion hood 27 has an inner surface corresponding to an end surface (outer end surface), a top surface and side surfaces of the end side of the reel leg part of the fishing reel, for example, and is structured to form an insertion space that gradually tapers from the insertion opening 29, in a space with the outer circumferential surface of the one end of the pipe seat 1 in the longitudinal direction, for accepting of insertion of the outer end of the reel leg part of the fishing reel.

The fixed hood part 3 is fixed on the outer circumferential surface of an end portion in the longitudinal direction of the pipe seat 1 using, for example, an adhesive in a state that the one end of the cylindrical fixed hood member 15 in the longitudinal direction matches one end of the pipe seat 1 in the longitudinal direction.

The movable hood part 11 of the movable hood body 9 includes a cylindrical movable hood member 31 made of plastic, and a cylindrical metal reinforcement connection sleeve 33 fitted over outer circumference of the movable hood member 31. One end in the longitudinal direction of the outer circumferential surface of the movable hood member 31, a ring-shaped protrusion 35 that slightly protrudes outwardly is integrally formed. The reinforcement connection sleeve 33 is fitted tightly on the outer circumferential surface of the movable hood member 31 in a state that the one end in the longitudinal direction contacts the ring-shaped protrusion 35. An engagement hole 37 is provided on the reinforcement connection sleeve 33, and an engagement protrusion 39 formed integrally on the outer circumferential surface of the movable hood part 11 or the movable hood member 31 is fitted to the engagement hole 37 without any space. Therefore, the reinforcement connection sleeve 33 is fitted on the movable hood part 11 or the movable hood member 31 in a state that it is fixed in the longitudinal and circumferential directions. The reinforcement connection sleeve 33 is equipped integrally with an inward curl 41 that slightly protrudes from the other end in the longitudinal direction of the movable hood part 11 or the movable hood member 31 to the other side in the longitudinal direction and that is formed by bending at the other end in the longitudinal direction. The reinforcement connection sleeve 33 is tightly fitted over the entire outer circumferential surface of the movable hood member 31 with exception of a part protruding from the other end in the longitudinal direction of the movable hood part 11 or the movable hood member 31.

The movable hood part 11 or the movable hood member 31 is structured by gradually expanding outwardly a predetermined portion in the circumferential direction of a cylindrical body having an inner diameter substantially equal to the outer diameter of the male thread part 5 of the pipe seat 1 to form a cover hood 43. One end in the longitudinal direction of the cover hood 43 is provided with a cover opening 45 facing the insertion opening 29 of the fixed hood part 3. The cover hood 43 has an inner surface of a shape corresponding to an end surface (outer end surface), a top surface and side surfaces of the outer end side of the reel leg part of the fishing reel, and is structured such that the cover hood 43 tightly covers the outer end of the reel leg part of the fishing reel positioned on the outer circumferential surface of the male thread part 5 of the pipe seat 1. Seats 47, which slightly protruding inwardly, are respectively formed on each of the ends in the width direction of the inner surface of the cover hood 43, and a seat surface 49 of the seat 47 extends substantially in parallel with the reel leg part of the fishing reel or in the width direction of the reel leg part of the fishing reel so that it corresponds to the backside of the outer end of the reel leg part of the fishing reel pole, and disappears as it extends beyond the center of the cover hood 43 in the longitudinal direction, while gradually reducing the amount of protrusion from the location near the cover opening 45 of the cover hood 43. That is, inner ends of the seats 47 and the seat surfaces 49 extend in parallel with each other, and are formed so as to position along the outer circumference of the male thread part 5 of the pipe seat 1. At a position facing the cover hood 43 on the inner surface of the movable hood part 11 or the movable hood member 31, a circumferential direction slippages prevention projection 51 that slidably fits into the slide guide groove 7 of the pipe seat is integrally formed.

The sliding nut 13 of the movable hood body 9 is formed as a cylindrical body made of plastic and has on the inner surface a female thread 53 which screws on the male thread part 5 of the pipe seat 1. On the outer circumferential surface, knurls 55 that extend in the longitudinal direction are carved, and a connecting toroidal groove 57 is structured on the outer circumference of one end in the longitudinal direction. The inward curl 41 fits relatively rotatably in the connecting toroidal groove 57, and the sliding nut 13 is connected rotatably to the movable hood part 11 by an engagement of the connecting toroidal groove 57 and the inward curl 41.

Similar to the cover hood 43, the insertion hood 27 of the fixed hood member 15 may have a seat extending slightly inside on each side of the inner surface in the width direction and may be structured so that the seat surface of the seat extends substantially parallel with the reel leg part of the fishing reel or in the width direction of the reel leg part of the fishing reel, such that the seats correspond to the backsides of the outer ends of the reel leg part of the fishing reel. With such a structure, slippages of the reel leg part of the fishing reel in the circumferential direction may be impeded effectively. The seats provided on the insertion hood 27 may have the characteristics of the seats 47 provided to the cover hood 43 in terms of the position and the shape.

Figure 5:
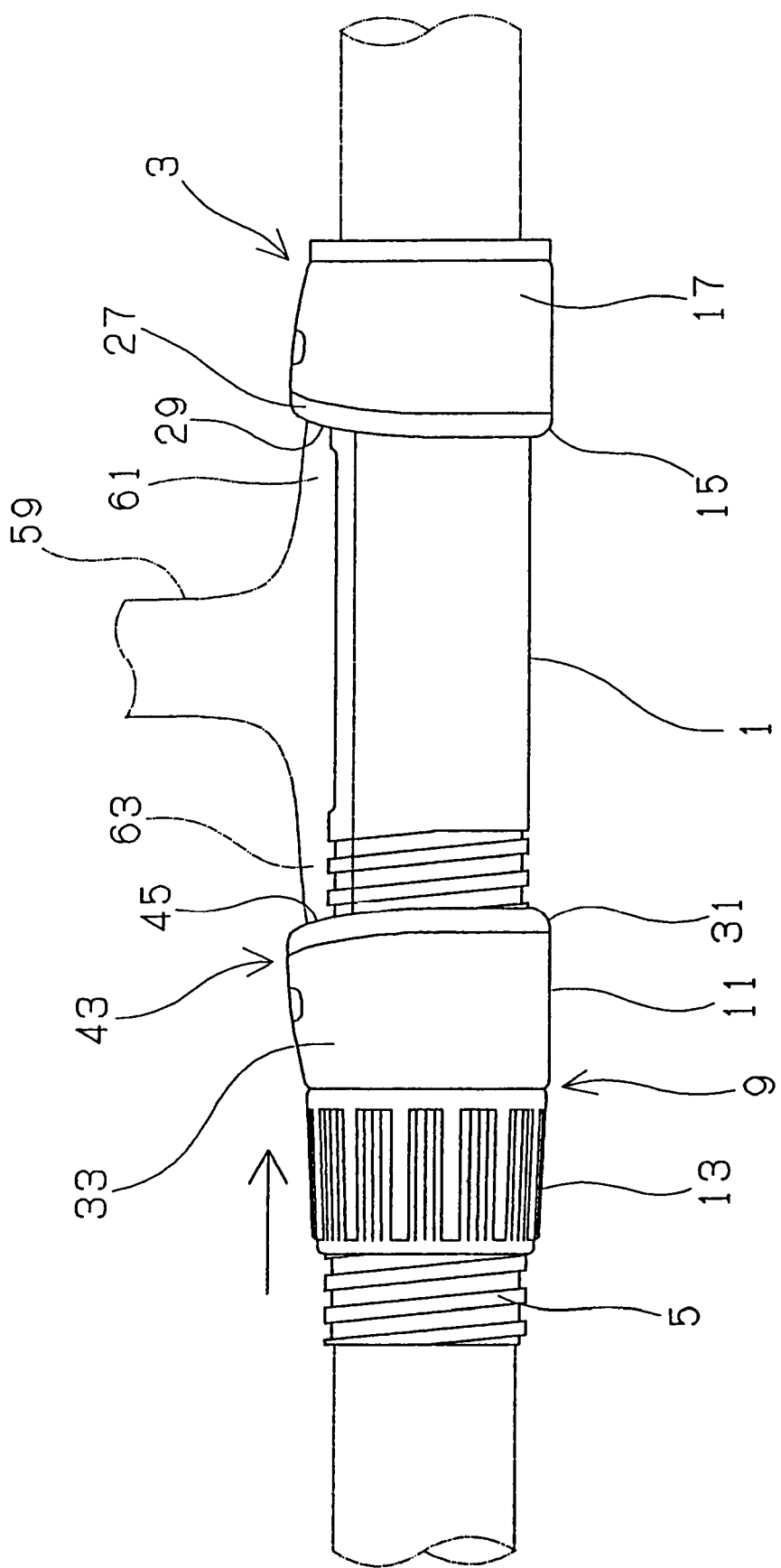
FIG. 5 is a side view showing a cover hood of the movable hood part covering a reel leg part of the fishing reel in accordance with an exemplary embodiment of the present invention.
Figure 6:
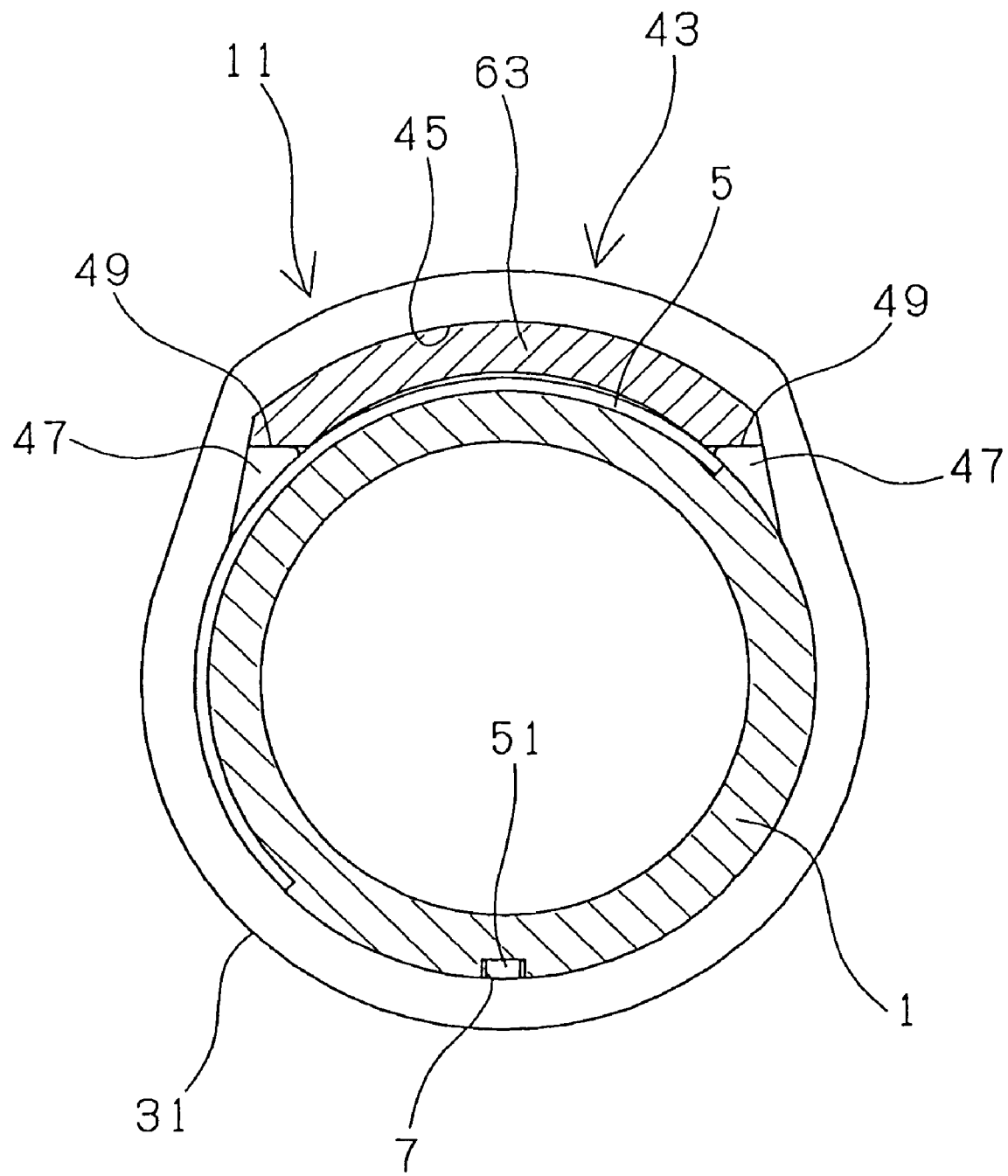
FIG. 6 is an interior-end view showing in partial cross-section the reel leg part of the fishing reel covered by the cover hood of the movable hood part in accordance with an exemplary embodiment of the present invention.

FIG. 5 is a diagram explaining a case in which the cover hood 43 of the movable hood part 11 covers the reel leg part of the fishing reel. FIG. 6 is a diagram showing a situation in which the reel leg part of the fishing reel is covered by the cover hood 43 of the movable hood part 11.

The pipe seat 1 forms a part of a fishing pole by being positioned at the butt end of the fishing pole, having the fixed food part 3 placed on the tip side of the fishing pole. To mount a fishing reel 59 on the pipe seat 1, the one reel leg part 61 of the fishing reel 59 is first inserted from the insertion opening 29 into the insertion hood 27 of the fixed hood part 3, to put the one reel leg part 61 and the other side of the reel leg part 63 of the fishing reel 59 on the pipe seat 1. Next, by rotating the sliding nut 13, the movable hood body 9 is moved towards the other side of the reel leg part 63 of the fishing reel 59, and the cover hood 43 of the movable hood part 11 covers the other side of the reel leg part 63 from the cover opening 45. At this time, the movable hood part 11 moves linearly without displacing in the circumferential direction since the circumferential direction slippages prevention projection 51 is fitted slidably in the slide guide groove 7 of the pipe seat 1. The front end of the cover hood 43 is positioned such that the seat surfaces 49 of the seats 47 in the cover hood 43 are inserted to the backsides of the end portions in the width direction of the other side of the reel leg part 63 that is distant from the male thread part 5 of the pipe seat 1, when it approaches the outer end of the other side of the reel leg part 63. Therefore, the cover hood 43 can smoothly cover the other side of the reel leg part 63. Then, when the movable hood body 9 is further moved towards the other side of the reel leg part 63 to further cover the other side of the reel leg part 63 by the cover hood 43, both ends in the width direction of the front end of the cover hood 43 are deformed such that they are pushed by the outer end or both ends in the width direction of the outer end part of the other side of the reel leg part 63 to expand. In accordance with this deformation of the cover hood 43, the seats 47 are slightly raised, and the seat surfaces 49 are pressed against the backsides of both sides in the width direction of the other side of the reel leg part 63. Therefore, the outer end of the other side of the reel leg part 63 is supported not only by the male thread part 5 of the pipe seat 1 but also by the seat surfaces 49 of the seats 47. Furthermore, since the movable hood part 11 tightens the male thread part 5 of the pipe seat 1 and the other side of the reel leg part 63, there is reduced, little or no play between the movable hood part 11 and the pipe seat 1, and the other side of the reel leg part 63 is also firmly fixed on the pipe seat 1. When the movable hood body 9 is moved towards the other side of the reel leg part 63 to further cover the other side of the reel leg part 63 by the cover hood 43, the ceiling of the cover hood 43 is deformed such that the ceiling is pressed by the outer end of the other side of the reel leg part 63 to expand outwardly. In accordance with this deformation of the cover hood 43, the seat surfaces 49 of the seats 47 are further pressed properly against the backside of the ends in the width direction, of the other side of the reel leg part 63. Both ends in the width direction of the other side of the reel leg part 63 properly contact areas substantially bordering between seat surfaces 49 of the seats 47 of the cover hood 43 and the inner surfaces (of the cover hood 43), so that there is reduced, little or no play in the width direction of the other side of the reel leg part 63. The mounting of the fishing reel 59 is completed by tightly covering the cover hood 43 onto the other side of the reel leg part 63 as described above.

As described above, embodiments of the present invention provide a mounting structure for a fishing reel in which the cover hood can be effectively or firmly attached to the reel leg part of the fishing reel, and as a result, the reel leg part of the fishing reel can be fixed such that there is reduced, little or no play.

Moreover, embodiments of the present invention provide a movable hood body for a fishing pole in which the cover hood can be effectively or firmly attached to the reel leg part of the fishing reel, and as a result, the reel leg part of the fishing reel can be fixed such that there is reduced, little or no play.

What is claimed is:

1. Mounting structure for a fishing reel including a first reel leg part and a second reel leg part opposing the first reel leg part, the mounting structure comprising:
    a pipe seat;
    a fixed hood part fixed on the pipe seat, the fixed hood including an insertion hood arranged to receive the first reel leg part of the fishing reel; and
    a movable hood part movable along the pipe seat in a longitudinal direction of the pipe seat and arranged to receive the second reel leg part of the fishing reel to capture the first reel leg part and the second reel leg part between the fixed hood part and the movable hood part and support the fishing reel, the movable hood part including a one-piece body defining, in cross-section, a single bore, an arcuate portion and a cover hood, the arcuate portion circumscribing at least a portion of the pipe seat and defining first and second seats at respective ends of the arcuate portion, the cover hood bridging the first and second seats, the movable hood part being arranged to receive the second reel leg part in an opening between the cover hood, the pipe seat, and the first and second seats such that the second reel leg part contacts the pipe seat, the first and second seats being arranged to support opposing edge portions of one surface of the second reel leg part and the cover hood being arranged to engage an opposing surface of the second reel leg part.

2. Mounting structure according to claim 1, wherein the arcuate portion of the movable hood part is cylindrical-shaped and fitted on an outer circumference of the pipe seat, and the cover hood is a radial extension of the cylindrical portion.

3. Mounting structure according to claim 1, wherein respective supporting surfaces of the first and second seats are substantially coplanar.

4. Mounting structure according to claim 2, wherein respective supporting surfaces of the first and second seats are substantially coplanar.

5. Mounting structure according to claim 1, wherein the cover hood is arranged to engage the opposing surface of the second reel leg part, and the first and second seas are arranged to support the opposing edge portions of the one surface of the second reel leg part without contacting respective opposing edge surfaces of the second reel leg part.

6. Mounting structure according to claim 2, wherein the cover hood is arranged to engage the opposing surface of the second reel leg part, and the first and second seats are arranged to support the opposing edge portions of the one surface of the second reel leg part without contacting respective opposing edge surfaces of the second reel leg part.

7. Mounting structure according to claim 1, wherein the arcuate portion of the movable hood part is cylindrical-shaped and fitted on an outer circumference of the pipe seat.

8. Mounting structure according to claim 1, wherein the cover hood is a radial extension of the arcuate portion.

9. Mounting structure according to claim 1, wherein the first and second seats extend along opposing sides of the opening in a longitudinal direction of the movable hood part.

10. Mounting structure according to claim 1, wherein the cover hood defines an opening that tapers in a longitudinal direction of the movable hood part.

11. Mounting structure according to claim 1, wherein the cover hood defines an opening having an arcuate upper surface.

12. A movable hood part for mounting on a fishing pole a fishing reel including a reel leg part, the movable hood part being movable along the fishing pole for receiving the reel leg part of the fishing reel, the movable hood part comprising:
    a one-piece body defining, in cross-section, a single bore an arcuate portion and a cover hood, the arcuate portion forming first and second seats at respective ends of the arcuate portion, the cover hood bridging the first and second seats, the movable hood part being arranged to receive the reel leg part in an opening between the cover hood and the first and second seats, the first and second seats being arranged to support opposing edge portions of one surface of the reel leg part and the cover hood being arranged to engage an opposing surface of the reel leg part.

* * * * *